United States Patent [19]

Katsurabayashi

[11] Patent Number: 5,233,653
[45] Date of Patent: Aug. 3, 1993

[54] APPARATUS AND METHOD FOR ENCIPHERED FACSIMILE TRANSMISSION AND RECEPTION

[75] Inventor: Masahiro Katsurabayashi, Saitama, Japan

[73] Assignee: Fuji Xerox Co., Ltd., Tokyo, Japan

[21] Appl. No.: 771,100

[22] Filed: Oct. 4, 1991

[30] Foreign Application Priority Data

Mar. 20, 1991 [JP] Japan .................................. 3-80496

[51] Int. Cl.⁵ .......................... H09N 1/44; H04L 9/00
[52] U.S. Cl. .......................................... 380/18; 380/42; 380/43; 380/50
[58] Field of Search ....................... 380/18, 42, 43, 50

[56] References Cited

U.S. PATENT DOCUMENTS 4,392,021  7/1983  Slate ....................... 380/18
4,912,761  3/1990  Tan et al. ................... 380/18

OTHER PUBLICATIONS

"Cryptography: A New Dimension in Computer Data Security," by Carl H. Meyer et al., Shizen-sha, Inc. 1986, pp. 71–75.

*Primary Examiner*—David Cain
*Attorney, Agent, or Firm*—Finnegan, Henderson, Farabow, Garrett & Dunner

[57] ABSTRACT

An enciphered facsimile apparatus in which encoded image data is fetched one block at a time, and chained encipherment is executed in a reverse direction, respectively. Upon completion of encipherment, the enciphered image data is read in the reverse direction, and is demodulated to transmit to a network. Meanwhile, on the reception side, the enciphered image data received is fetched one block at a time, and deciphering is effected in the reverse direction. Upon completion of deciphering, decoding is effected in the reverse direction so as to confirm whether or not deciphering has been effected correctly. Thereby, the image data enciphered cannot be readily deciphered by a third party.

14 Claims, 6 Drawing Sheets

APPARATUS AND METHOD FOR ENCIPHERED FACSIMILE TRANSMISSION AND RECEPTION

BACKGROUND OF THE INVENTION

The present invention relates to an enciphered facsimile apparatus, and more particularly to an enciphered facsimile apparatus for transmitting or receiving image information enciphered by a chained enciphering method.

Conventionally, in a case where an attempt is made to effect image communication by facsimile without letting the communication known to a third party, the communication is effected by enciphering image data. There are various methods of enciphering, and a chained enciphering method is one of them.

Figure 7:
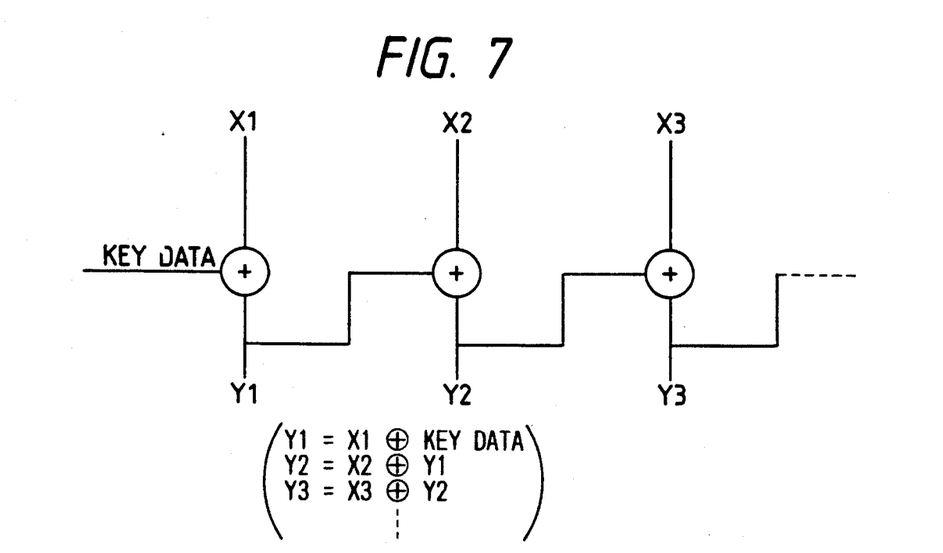
FIG. 7 is a diagram illustrating the basic principle of chained encipherment.

As for the basic principle of this enciphering method, in a case where a plain text (an original text to be enciphered) is comprised of elements X1, X2, X3, ..., as shown in FIG. 7, the first element X1 and arbitrary key data are exclusively ORed to determined a first encipher text element Y1, and then the second element X2 and the enciphered text element Y1 are exclusively ORed to create a second enciphered text element Y2. In the same way thereafter, the third element X3 of the original text and the enciphered text element Y2 are exclusively ORed to create a third enciphered text element Y3.

Figure 8:
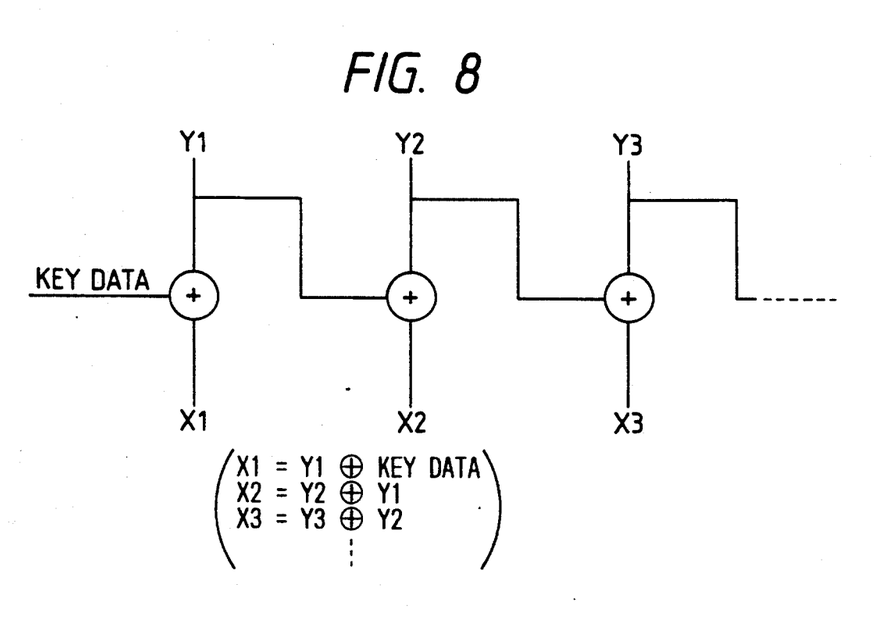
FIG. 8 is a diagram illustrating the basic principle of deciphering data enciphered by a chained enciphering method.

To decipher the enciphered text, as shown in FIG. 8, the first enciphered text element Y1 and the key data are exclusively ORed to obtain the first element X1 of the original text. Then, the second enciphered text element Y2 and the enciphered text element Y1 are exclusively ORed to obtain the second original text element X2. Thereafter, deciphering is continued by similar processing.

Concerning the above-described encipherment, a disclosure is given in "Block Chain Using Feedback of Plain Text and Enciphered Text" on pages 71–75 in a publication "Cipher: New Development of Protection of Computer Data" published by Kabushiki Kaisha Shizensha on Feb. 10, 1986.

In effecting confidential communication, the transmission-side facsimile apparatus first encodes image data read by an image scanner or the like, subsequently enciphers the same by the above-described method, and then modulates the enciphered data and transmits the same to a line. The reception-side facsimile apparatus demodulates the data received, and after deciphering the enciphered text by the above-described deciphering method, the reception-side facsimile apparatus decodes the same. Then, this decoded text is sent to a printer so as to be printed out.

In this case, since the method of sequentially deciphering the image data beginning with its leading end is adapted in the transmission-side facsimile apparatus, the reception-side facsimile apparatus sequentially deciphers the image data received beginning with its leading end according to the conventional method.

In the communication of an image using a facsimile apparatus, the deciphering of the image data enciphered by the above-described enciphering method has hitherto been effected starting with the leading end of the image data. Therefore, firstly, the starting point of commencing deciphering is obvious to anyone, and, secondly, since the image data deciphered is sequentially decoded beginning with the leading end thereof, it is possible to easily confirm whether or not deciphering has been effected correctly. For these reasons, there has been the problem that it is relatively easy for a third party to effect deciphering.

In Addition, in a case where image data enciphered by the above-described chained enciphering method is transmitted, if a data error occurs in the course of transmission, it becomes impossible to decode the subsequent data. Hence, the facsimile apparatus adopting the enciphering method has had the problem that it is vulnerable to noise.

SUMMARY OF THE INVENTION

An object of the present invention is to provide an enciphered facsimile apparatus which is arranged such that image data enciphered by the above-described chained enciphering method cannot be easily deciphered by a third party, thereby overcoming the above-described drawbacks of the conventional art.

Another object of the present invention is to provide an enciphered facsimile apparatus which is practically unaffected by noise.

To attain the above-described objects, according to the first aspect of the present invention, the facsimile apparatus is characterized by comprising: enciphering means for effecting chained encipherment with respect to the encoded image data by each predetermined amount in a reverse direction; and data transmitting means for transmitting the enciphered data in a reverse direction.

The encoded image data is fetched by each predetermined amount, and the image data fetched is enciphered in a reverse direction by a chained enciphering method. Then, the enciphered image data is read in a reverse direction, and the data is modulated and outputted.

According to the second aspect of the invention, the facsimile apparatus is characterized by comprising: deciphering means for deciphering the enciphered data received, by each predetermined amount in a reverse direction; and means for decoding the deciphered data in a reverse direction.

The enciphered data received is fetched by each predetermined amount, and is deciphered in a reverse direction. Upon completion of the deciphering of the predetermined amount, the data is decoded in a reverse direction. Thus, in order to decipher the enciphered data received, the enciphered data received must be fetched by each predetermined amount, must then be deciphered in a reverse direction, and decoded in a reverse direction, so that the data is difficult for a third party to decipher.

According to the third aspect of the invention, the facsimile apparatus is characterized by comprising: means for effecting communication by an error correction mode (ECM) when a chained enciphering method has been selected.

When a chained enciphering method is selected, the error correction mode (ECM) is established. For this reason, even if error data is mixed in the transmitted data in the course of transmission, it is possible to avoid the same by retransmitting it, so that the reliability of communication by the chained enciphering method can be improved.

DESCRIPTION OF THE PREFERRED EMBODIMENTS

Embodiments of the present invention will be described with reference to the drawings.

Figure 5:
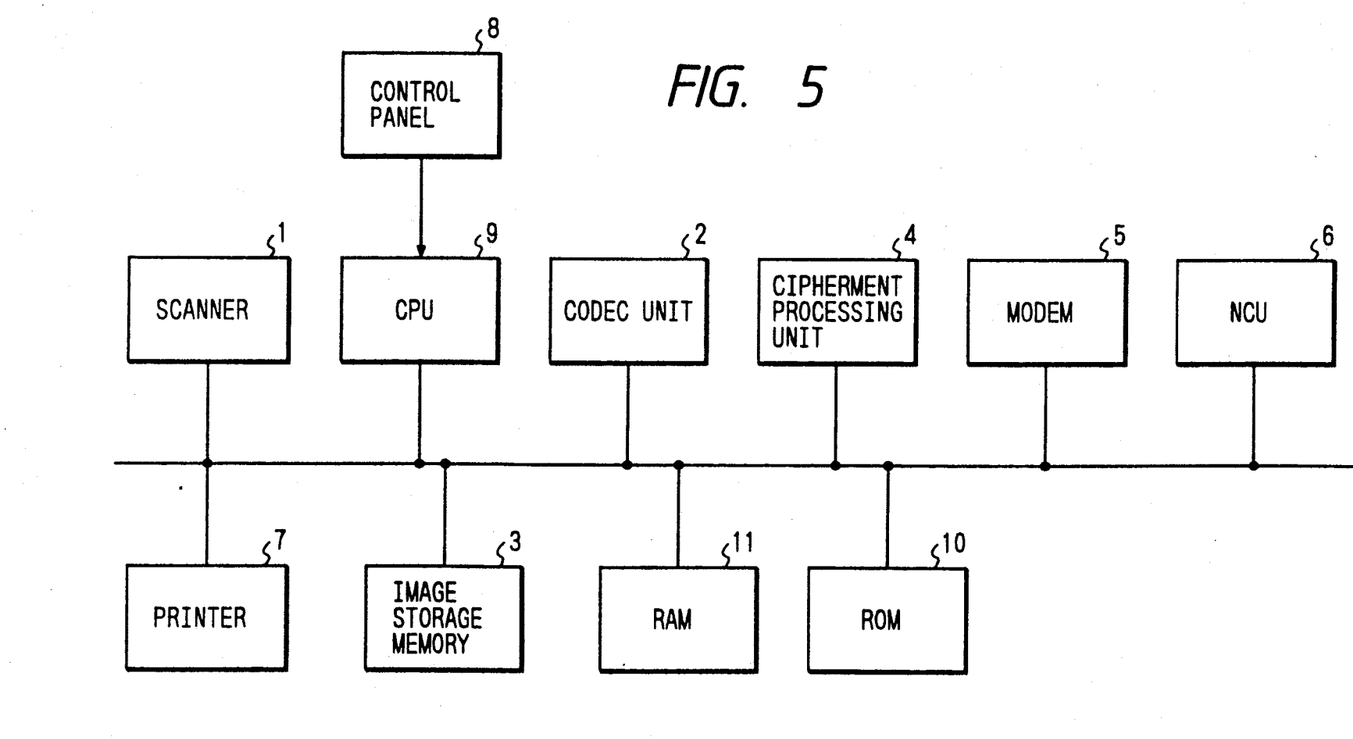
FIG. 5 is a block diagram illustrating a hardware configuration of a facsimile apparatus according to the present invention.

FIG. 5 is a block diagram illustrating a hardware configuration of a facsimile apparatus of the present invention. In the drawing, reference numeral 1 denotes a scanner for reading document information and converting the same into image information of electrical signals. Reference 2 denotes a codec (CODEC) unit which encodes the image information by an encoding method with a good compression rate or decodes the image information encoded. Numeral 3 denotes an image storage memory for storing the image information compressed. Numeral 4 denotes a ciphering-processing unit for enciphering the image information encoded or deciphering the image information enciphered. Numeral 5 denotes a modem for modulating the image information enciphered or demodulating the image information received. Numeral 6 denotes a network control unit (NCU) for automatically effecting dialing to call the other station and effecting a predetermined communication procedure and the like through a predetermined protocol if there has been an instruction for transmission by one-touch dialing or abbreviated dialing.

In addition, numeral 7 denotes a printer for printing out the received image information on paper. Numeral 8 denotes a control panel having a 10-key pad, function keys, a display, etc. Numeral 9 denotes a system control unit (CPU) for controlling the overall operation of the facsimile apparatus. Numeral 10 denotes a ROM for storing therein a control program, various basic data and the like for operating this system. Numeral 11 denotes a RAM for providing a work area and storing therein data and the like set by the user through the control panel 8.

In the facsimile apparatus having the above-described configuration, the image information read by the scanner 1 is encoded by the codec unit 2, and is temporarily stored in the image storage memory 3. Subsequently, the image information is read from the image storage memory 3 and is sent to the encipherment processing unit 4 to be enciphered by the above-described chained enciphering method. Then, the enciphered image information is demodulated by the modem 5, and is sent to the network control unit 6.

Meanwhile, upon receiving the enciphered image information from the line control unit 6, the reception-side facsimile apparatus sends the same to the modem 5 to effect demodulation. Then, in the ciphering-processing unit 4, the enciphered image information is deciphered and is temporarily stored in the image storage memory 3. Subsequently, this image information is sent to the codec unit 2, and the codec unit 2 decodes the image information. The decoded image information is sent to the printer 7 and is printed out on the paper.

The present invention is an improvement of the enciphering processing unit 4, and a detailed description of an embodiment will be given hereinunder.

Figure 1:
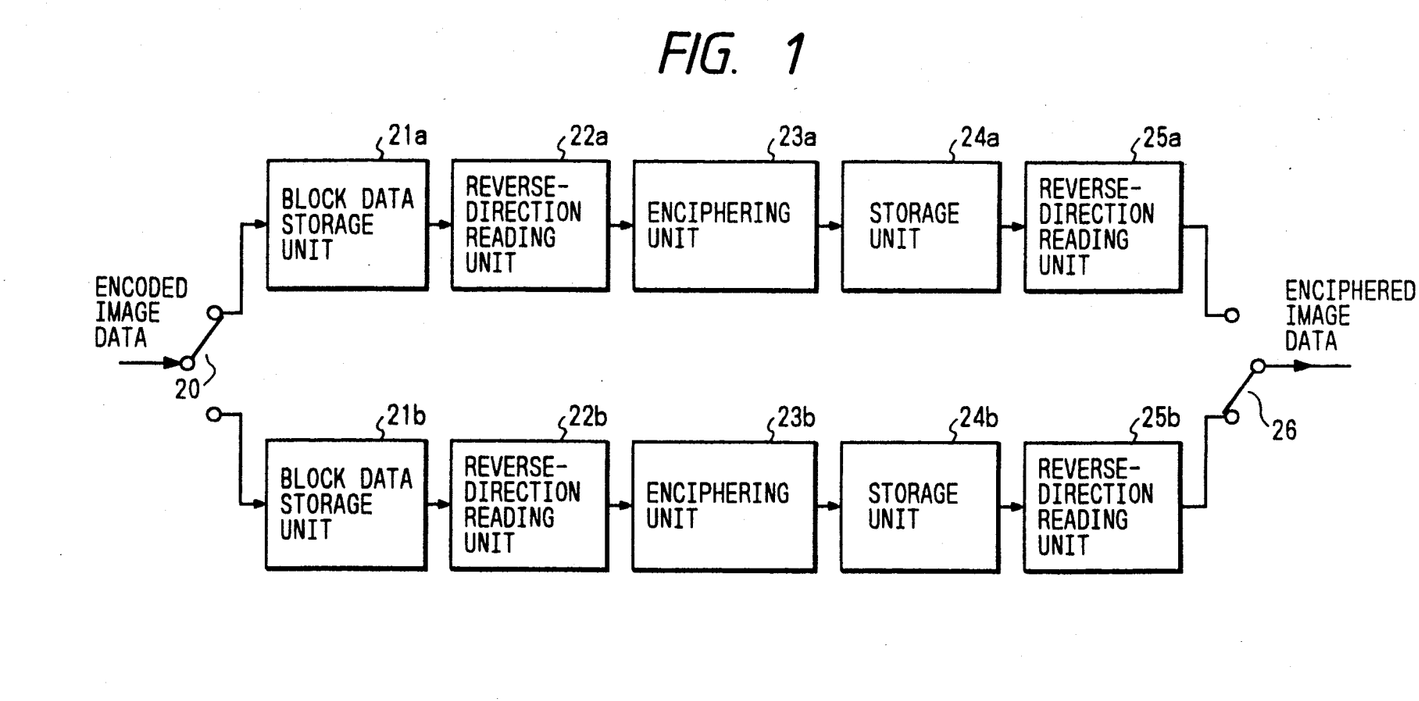
FIG. 1 is a functional block diagram of an embodiment of the present invention at the time of enciphering.

FIG. 1 is a functional block diagram illustrating an embodiment of the ciphering-processing unit 4. In the drawing, reference numerals 21a, 21b denote block data storage units; 22a, 22b, reverse-direction reading units; 23a, 23b, enciphering units; 24a, 24b, storage units; and 25a, 25b, reverse-direction reading units, two identical systems of circuits being thus prepared. These circuits are used by being alternately switched over each time the amount of data accumulated in the block data storage units 21a, 21b reaches a fixed amount.

A predetermined amount of the encoded image data is first stored in the block data storage unit 21a. Upon completion of storage of this predetermined amount, the image data is then stored in the block data storage unit 21b.

Figure 2:
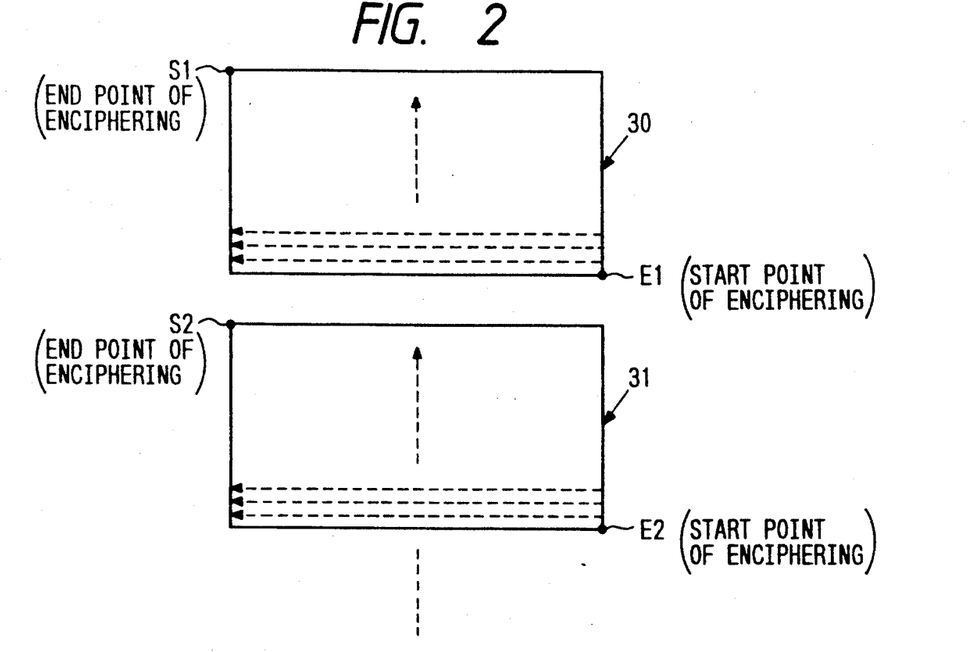
FIG. 2 is a diagram explaining the operation of enciphering.

Reference numeral 30 in FIG. 2 denotes block data stored in the block data storage unit 21a, while numeral 31 denotes block data stored in the blocked data storage unit 21b. Reference character S1 of the block data indicates the starting point of accumulation of the block data, while E1 indicates the ending point of accumulation. Similarly, S2 of the block data 31 indicates the starting point of accumulation of the block data, while E2 indicates the ending point of accumulation.

While the image data is being stored in the block data storage unit 21b, the reverse-direction reading unit 22a reads the data stored in the block data storage unit 21a in a reverse direction, and sends the same to the enciphering unit 23a. The enciphering unit 23a sequentially enciphers the inputted data by the above-described chained enciphering method. The enciphered image data is stored in the storage unit 24a, and is read in a reverse direction by the reverse-direction reading unit 25a. The data thus read is sent to the modem 5.

When the predetermined amount of data is accumulated in the block data storage unit 21b, the enciphering of the block data in the block data storage unit 21a is completed, so that new image data is sent again to the block data storage unit 21a and is stored therein. While the image data is being stored in the storage unit 21a, the data stored in the block data storage unit 21b is read by the reverse direction reading unit 22b in the reverse direction. Then, the data is enciphered by the enciphering unit 23b, and after undergoing a process similar to the one described above, the data is sent to the modem 5.

In terms of the order of enciphering in the enciphering units 23a, 23b, enciphering is effected for each block data in the direction of E1 → S1, E2 → S2, ... The data thus enciphered in the reverse direction is temporarily stored in the storage units 24a, 24b, and is then read again in the reverse direction by the reverse-direction reading units 25a, 25b. Hence, the enciphered image data is transmitted sequentially in the order from S1, S2, ... in FIG. 2.

Figure 3:
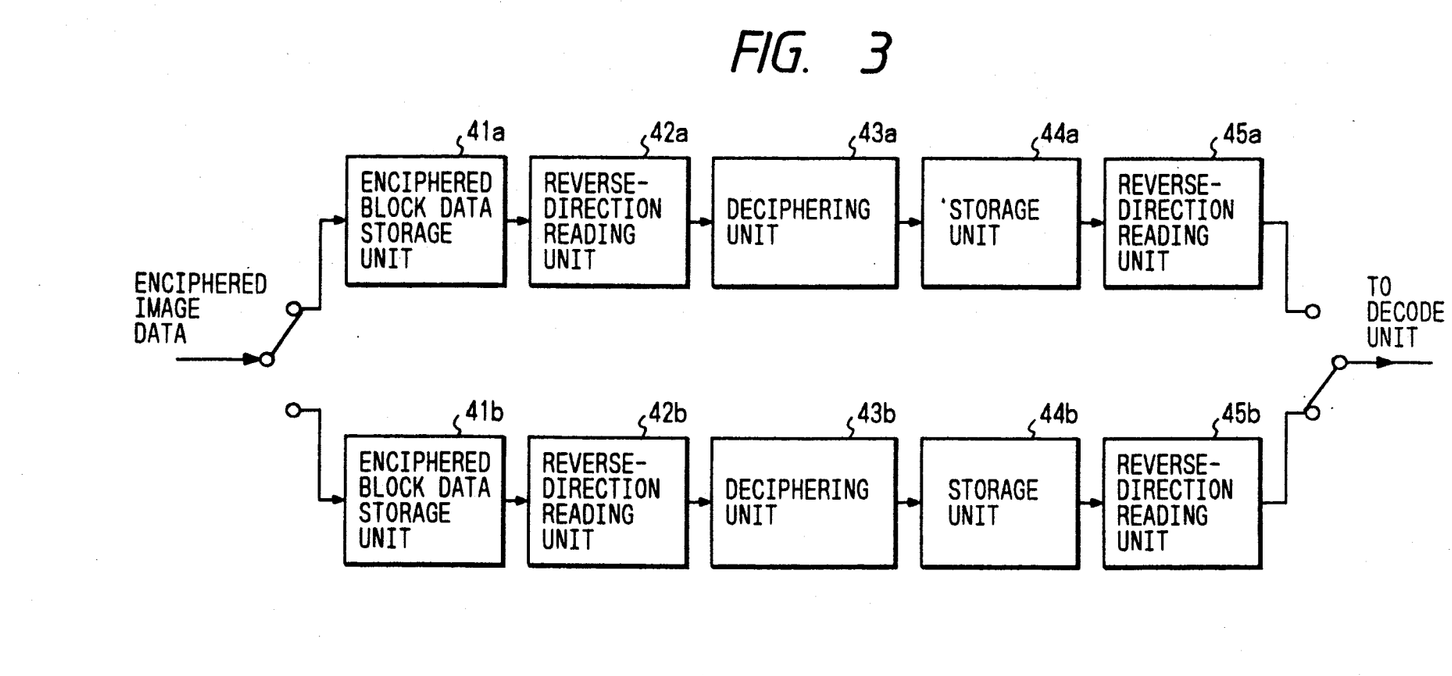
FIG. 3 is a functional block diagram of an embodiment of the present invention at the time of deciphering enciphered image data.

Referring now to a functional block diagram shown in FIG. 3, a description will be given of an embodiment of a deciphering portion of the ciphering-processing unit 4.

In the drawing, reference numerals 41a, 41b denote enciphered block data storage units for storing the enciphered data received; 42a, 42b, reverse-direction reading units; 43a, 43b, deciphering units; 44a, 44b, storage units; and 45a, 45b, reverse-direction reading units.

The image data received is first sent to the enciphered block data storage unit 41a to be stored therein. When a predetermined amount of data has been stored in the unit 41a, the enciphered image data is then stored in the enciphered block data storage unit 41b. While the enciphered image data is being stored in the enciphered block data storage unit 41b, the reverse-direction reading unit 42a reads the data in the reverse-direction, and sends it to the deciphering unit 43a. The deciphering unit 43a deciphers the enciphered image data in the above-described method and temporarily stores the same in the storage unit 44a.

Figure 4:
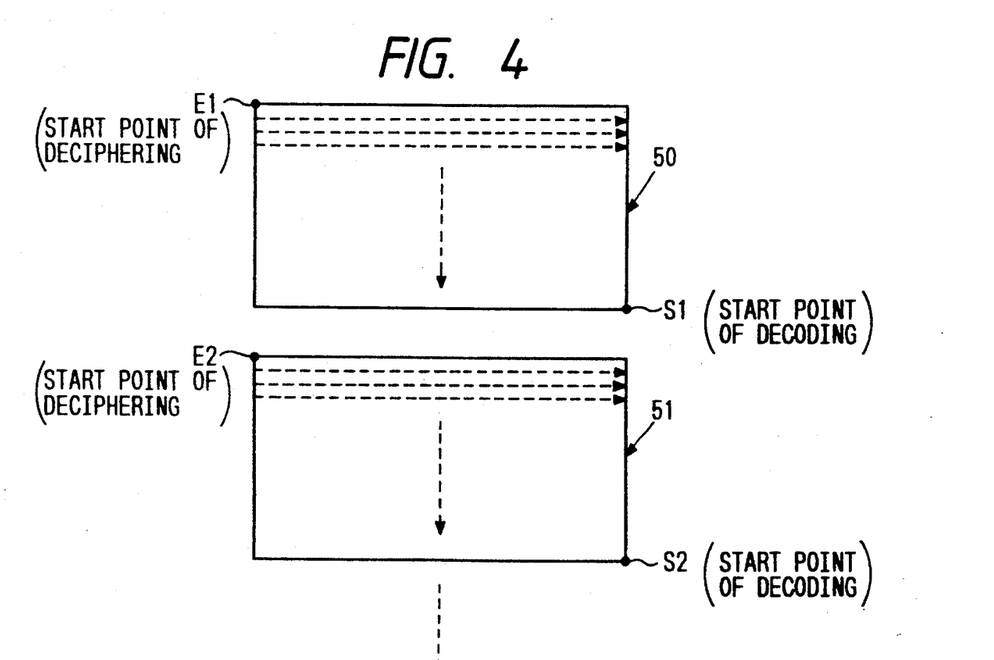
FIG. 4 is a diagram explaining the operation of the aforementioned deciphering.

FIG. 4 shows enciphered blocked data 50 which is deciphered by the deciphering unit 43a. In the deciphering unit 43a, the data is deciphered beginning with the trailing end of the block, i.e., from E1 toward S1. Then, the deciphered data is stored in the storage unit 44a in this order.

When one block of the data deciphered is accumulated in the storage unit 44a, the reverse-direction reading unit 45a reads the data in the reverse direction. As a result, the image data is sequentially read correctly, beginning with the leading end, i.e., S1 in FIG. 2, and is then sent to the codec unit 2.

When one block of the enciphered image data is stored in the enciphered block data storage unit 41b, the enciphered image data is then stored in the enciphered block data storage unit 41a. While the enciphered image data is being stored in the enciphered block data storage unit 41a, the data stored in the enciphered block data storage unit 41b is sequentially read by an operation similar to the above-described operation, and is then sent to the codec unit 2.

As is evident from the foregoing description, in accordance with this embodiment, the image information transmitted is enciphered in units of blocks in a reverse direction, and is transmitted in a reverse direction thereof. Meanwhile, the receiving side receives the received image information in the units of blocks, and is deciphered in the reverse direction.

When a confirmation is made as to whether or not deciphering has been effected correctly, all the data in one block is deciphered, and the deciphered data is decoded in the reverse direction.

Accordingly, when a third party attempts to receive image information with malicious intent, only when the following procedure is taken, can the third party ascertain that the image information has been deciphered correctly. That is first, the position where the blocks of the image data received are demarcated and are detected, and what key data is used is detected. After one block of data is deciphered by using this key data, the data is sequentially decode beginning with the trailing end of the deciphered data. Then, an examination is made as to whether or not the number of bits per line, for instance, is a predetermined number.

Accordingly, the deciphering process becomes troublesome, so that if image data is enciphered by the apparatus of this embodiment, it is possible to except a meritorious effect that the third party cannot readily decipher the image data.

Another embodiment of the present invention will be described with referring to FIG. 6. Since the first embodiment is a communication system using the chained enciphering method, there is a drawback in that if a data error occurs due to the mixing in of noise or the like in the course of communication, the subsequent data cannot be decoded correctly. This drawback is overcome by this second embodiment.

Figure 6:
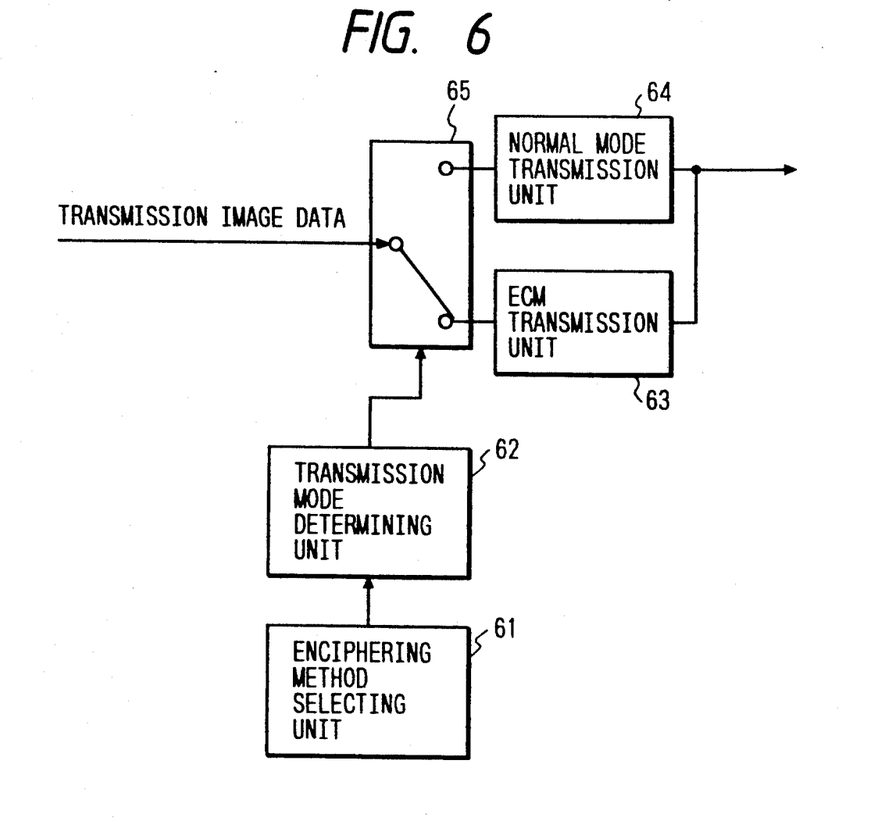
FIG. 6 is a functional block diagram of a second embodiment of the present invention.

In FIG. 6, reference numeral 61 denotes an enciphering method selecting unit disposed on the control panel 8. Numeral 62 denotes a transmission mode determining unit. If the chained enciphering method is selected by the enciphering method selecting unit 61, transmission by ECM (error correction mode) is determined. Meanwhile, when communication by un-enciphering or communication by another enciphering method is selected, the transmission mode determining unit 62 detects communication by a normal mode.

Numeral 63 denotes an ECM transmission unit for executing ECM communication, numeral 64 denotes a normal-mode transmission unit for executing communication by the normal mode, and numeral 65 denotes a switching unit.

Next, a description will be given of the operation of this embodiment.

If the chained enciphering method is selected by the enciphering method selecting unit 61 before a start button for starting the transmission of image information is pressed, the transmission mode determining unit 62 determines transmission by ECM (error correction mode). Subsequently, when the start button is pressed, the transmission side announces during a protocol communication that transmission will be effected through ECM.

When the conditions of communication through ECM are established between the transmission- and reception-side facsimile apparatus, the image data enciphered as the first embodiment is sent to the ECM transmission unit 63, and communication is effected through ECM. As is known, ECM is a system in which if a data error occurs during transmission, the reception side detects the same, and requests retransmission. Accordingly, in the event that a data error has happened to occur due to the occurrence of noise in the course of transmission, the reception side requests the transmission side to retransmit correct data, so that the correct data is unfailingly transmitted to the reception side. Hence, it is possible to overcome the drawback that the enciphered data received cannot be enciphered by the reception side.

As described above, in accordance with this embodiment, it is possible to overcome the weakness of communication based on the chained enciphering method.

As is evident from the above description, in accordance with the present invention, there is an advantage in that since the image data is enciphered for each block in the reverse direction by the chained enciphering method, it is possible to provide enciphered image data which is difficult for a third party to decipher, i.e., which is difficult to wiretap.

In addition, since the enciphered image data can be transmitted through ECM (error correction mode), there is another advantage in that even if there occurs a data error attributable to noise or the like occurring in the course of transmission, it is possible to cope with the situation. For this reason, there is an advantage in that the reliability of communication through an enciphering system can be improved.

What is claimed is:

1. An apparatus for enciphered fascimile transmission of inputted data comprising:
   first storing means for storing a block of inputted data in sequential order;
   first reading means for reading said block of data from said first storing means in reverse sequential order;
   means for chain enciphering data read by said first reading means;
   second storing means for storing data chain enciphered by said chain enciphering means in sequential order;
   second reading means for reading data from said second storing means in reverse sequential order; and
   means for transmitting data read by said second reading means.

2. An apparatus for enciphered fascimile transmission according to claim 1 further comprising means for receiving transmitted data including:
   third storing means for storing a block of received data in sequential order;
   third reading means for reading said block of data from said third storing means in reverse sequential order;
   means for deciphering said data read by said third reading means;
   fourth storage means for storing data deciphered by said deciphering means in sequential order;
   fourth reading means for reading data from said fourth storage means in reverse sequential order; and
   means for outputting data from said fourth reading means.

3. An apparatus for enciphered fascimile transmission according to claim 1 further comprising:
   means for encoding input data, said encoding means being disposed between said input means and said first storing means.

4. An apparatus for enciphered fascimile transmission according to claim 2 further comprising:
   means, disposed between said input means and said first storing means, for encoding input data; and
   means, coupled to said output means, for decoding data.

5. An apparatus for enciphered fascimile transmission according to claim 2, said receiving means including means for detecting a transmission error, and said transmitting means including means for retransmitting data when a transmission error is detected by said detecting means.

6. An apparatus for enciphered fascimile transmission comprising:
   means for inputting data to be transmitted;
   first and second storing means, alternately coupled to said input means, for storing in sequential order said first and second blocks of inputted data, respectively;
   first and second reading means for reading in reverse sequential order said first and second blocks of data from said first and second storing means, respectively;
   first and second means for chain enciphering data read by said first and second reading means, respectively;
   third and fourth storing means for storing in sequential order data chain enciphered by said first and second enciphering means, respectively;
   third and fourth reading means for reading in reverse sequential order, data from said third and fourth storing means, respectively; and
   means for alternately transmitting data read by said third and fourth reading means.

7. An apparatus for enciphered fascimile transmission according to claim 6, further comprising means for receiving transmitted data including;
   fifth and sixth means, alternately coupled to said receiving means, for storing sequentially first and second blocks of received data, respectively;
   fifth and sixth means for reading in reverse sequential order said first and second blocks of received data from said fifth and sixth storing means, respectively,
   first and second means for deciphering data read by said fifth and sixth reading means, respectively;
   seventh and eighth storing means for storing sequentially data deciphered by said first and second deciphering means respectively;
   seventh and eighth means for reading in reverse sequential order data stored in said seventh and eighth storage means respectively; and
   means for alternately outputting data from said seventh and eighth reading means.

8. An apparatus for enciphered fascimile transmission according to claim 6 further comprising:
   means for alternately coupling said first and second storing means to said input means; and
   means, disposed between said input means and said coupling means; for encoding input data.

9. An apparatus for enciphered fascimile transmission according to claim 7 further comprising:
   first means for alternately coupling said first and second storing means to said input means; and
   means, disposed between said input means and said first coupling means, for encoding input data;
   second means for alternately coupling said output means to said seventh and eighth reading means; and
   means, disposed between said second coupling means and said output means, for decoding data.

10. An apparatus for enciphered fascimile transmission according to claim 7, said receiving means including means for detecting a transmission error, and said transmitting means including means for retransmitting data when a transmission error is detected by said detecting means.

11. An apparatus for reception of transmitted enciphered fascimile data comprising:
    means for storing a block of received data in sequential order;
    means for reading said block of received data from said received data storing means in reverse sequential order;
    means for deciphering said block of received data read by said received data reading means to form a block of deciphered data;
    means for storing said block of deciphered data deciphered by said deciphering means in sequential order;
    means for reading said block of deciphered data from said deciphered data storing means in reverse sequential order; and means for outputting said block of deciphered data from said deciphered data reading means.

12. A method for enciphered fascimile transmission of inputted data comprising the steps of:
    encoding the inputted data;
    grouping the inputted data into blocks of data;
        storing the inputted data in each block of data in a sequential order;
        reading the inputted data in each block of data, stored in the inputted data storing step, in reverse of the sequential order in which the inputted data in each block of data was stored;
        chain enciphering the inputted data read in the inputted data reading step;
        storing the enciphered data in each block of data in a sequential order;
        reading the enciphered data in each block of data, stored in the enciphered data storing step, in reverse of the sequential order in which the enciphered data in each block of data was stored; and
    transmitting the enciphered data in each block of data read in the enciphered data reading step.

13. A method for enciphered fascimile transmission according to claim 12, further comprising the step of receiving enciphered data transmitted in the transmitting step, said step of receiving enciphered data including the steps of:
    grouping the received enciphered data into blocks of data;
    storing the received enciphered data in each block of data in a sequential order;
    reading the received enciphered data in each block of data, stored in the received enciphered data storing step, in reverse of the sequential order in which the received enciphered data in each block of data was stored;
    deciphering the received enciphered data in each block of data read in the received enciphered data reading step;
    storing the deciphered data in each block of data in a sequential order;
    reading the deciphered data in each block of data, stored in the deciphered data storing step, in reverse of the sequential order in which the deciphered data in each block of data was stored;
    decoding the data in each block of data read in the deciphered data reading step; and
    outputting the decoded data in each block of data.

14. A method for receiving transmitted enciphered fascimile data comprising the steps of:
    grouping received enciphered data into blocks of enciphered data;
    storing the enciphered data in each block of enciphered data in a sequential order;
    reading the enciphered data in each block of enciphered data, stored in the enciphered data storing step, in reverse of the sequential order in which the enciphered data in each block of enciphered data was stored;
    deciphering the enciphered data in each block of enciphered data read in the enciphered data reading step to form a block of deciphered data corresponding to each block of enciphered data;
    storing the deciphered data in each block of deciphered data in a sequential order;
    reading the deciphered data in each block of deciphered data, stored in the deciphered data storing step, in reverse of the sequential order in which the deciphered data in each block of deciphered data was stored;
    outputting the deciphered data read in said deciphered data reading step.

* * * * *

UNITED STATES PATENT AND TRADEMARK OFFICE
CERTIFICATE OF CORRECTION

PATENT NO. : 5,233,653
DATED : August 03, 1993
INVENTOR(S) : Masahiko Katsurabayashi It is certified that error appears in the above-indentified patent and that said Letters Patent is hereby corrected as shown below:

```
Claim 1, column 7, line 2, change "fascimile" to --facsimile--.
Claim 2, column 7, line 19, change "fascimile" to --facsimile--.
Claim 3, column 7, line 37, change "fascimile" to --facsimile--.
Claim 4, column 7, line 42, change "fascimile" to --facsimile--.
Claim 5, column 7, line 48, change "fascimile" to --facsimile--.
Claim 6, column 7, line 54, change "fascimile" to --facsimile--.
Claim 7, column 8, line 9, change "fascimile" to --facsimile--.
Claim 8, column 8, line 29, change "fascimile" to --facsimile--.
Claim 9, column 8, line 35, change "fascimile" to --facsimile--.
Claim 10, column 8, line 46, change "fascimile" to --facsimile--.
Claim 11, column 8, line 54, change "fascimile" to --facsimile--.
Claim 12, column 9, line 3, change "fascimile" to --facsimile--.
Claim 13, column 9, line 23, change "fascimile" to --facsimile--.
```

UNITED STATES PATENT AND TRADEMARK OFFICE
CERTIFICATE OF CORRECTION

PATENT NO. : 5,233,653
DATED : August 03, 1993
INVENTOR(S) : Masahiko Katsurabayashi It is certified that error appears in the above-indentified patent and that said Letters Patent is hereby corrected as shown below:

Claim 14, column 10, line 13, change "fascimile" to --facsimile--

Signed and Sealed this

Twelfth Day of July, 1994

Attest:

BRUCE LEHMAN

Attesting Officer     Commissioner of Patents and Trademarks